(12) United States Patent
Held et al.

(10) Patent No.: US 10,060,724 B2
(45) Date of Patent: Aug. 28, 2018

(54) METHOD, COMPUTER PROGRAM PRODUCT AND MEASURING SYSTEM FOR OPERATING A TRIANGULATION LASER SCANNER TO IDENTIFY PROPERTIES OF A SURFACE OF A WORKPIECE TO BE MEASURED

(71) Applicant: Carl Zeiss Industrielle Messtechnik GmbH, Oberkochen (DE)

(72) Inventors: Tobias Held, Noerdlingen (DE); Daniel Plohmann, Lauingen (DE); Oliver Rettenmaier, Aalen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 0 days.

(21) Appl. No.: 15/706,726

(22) Filed: Sep. 17, 2017

(65) Prior Publication Data
US 2018/0080755 A1    Mar. 22, 2018

(30) Foreign Application Priority Data
Sep. 21, 2016    (DE) .................... 10 2016 218 056

(51) Int. Cl.
*G01B 11/03*    (2006.01)
*G06T 7/521*    (2017.01)
(Continued)

(52) U.S. Cl.
CPC .............. *G01B 11/03* (2013.01); *G01B 11/25* (2013.01); *G01B 11/30* (2013.01);
(Continued)

(58) Field of Classification Search
CPC .......... G01B 11/03; G01B 11/25; G06T 7/521
(Continued)

(56) References Cited

U.S. PATENT DOCUMENTS 6,260,001 B1    7/2001  Bengala
8,284,240 B2    10/2012 Saint-Pierre et al.
(Continued)

FOREIGN PATENT DOCUMENTS

| CA | 2375013 A1 | 5/1996 |
|---|---|---|
| DE | 102015101079 A1 | 7/2015 |
| WO | 2014117870 A1 | 8/2014 |

*Primary Examiner* — Roy M Punnoose
(74) *Attorney, Agent, or Firm* — Ewers & Hasselmann PLLC

(57) ABSTRACT

A method, a computer program product and a measuring system are provided for operating a triangulation laser scanner to identify surface properties of a workpiece. The scanner has a CMOS sensor chip, an imaging optical unit, and a laser line light source configured to generate a laser line on the workpiece in compliance with a Scheimpflug condition. Data generated on the sensor chip is reduced to an amount of data only including actual lateral positions of image points of the laser line and a quality criterion for each of the image points. The quality criterion is a measure of an intensity distribution along a direction transverse to a local direction of extent of the image points of the laser line on the sensor chip and the reduced amount of data is analyzed with respect to the quality criterion regarding a presence of barcode and/or detection code information and/or texture information.

12 Claims, 5 Drawing Sheets

(51) Int. Cl.
    *G01B 11/25*     (2006.01)
    *G01B 11/30*     (2006.01)
    *G06K 7/10*     (2006.01)
    *G01S 17/42*     (2006.01)

(52) U.S. Cl.
    CPC ..... *G06K 7/10594* (2013.01); *G06K 7/10752* (2013.01); *G06T 7/521* (2017.01); *G01B 2210/58* (2013.01); *G01S 17/42* (2013.01); *G06T 2207/10028* (2013.01)

(58) Field of Classification Search
    USPC .......................................................... 356/601
    See application file for complete search history.

(56) References Cited

U.S. PATENT DOCUMENTS

| | | | |
|---|---|---|---|
| 9,488,469 B1 * | 11/2016 | Michael | G01B 11/25 |
| 2003/0089779 A1 | 5/2003 | Giordano et al. | |
| 2008/0128507 A1 | 6/2008 | Tsikos et al. | |
| 2011/0267431 A1 | 11/2011 | Steinbichler et al. | |
| 2011/0270562 A1 * | 11/2011 | Ito | G01B 11/25 702/94 |
| 2015/0213606 A1 | 7/2015 | Akopyan et al. | |
| 2017/0010356 A1 * | 1/2017 | Demirel | G01B 11/00 |

* cited by examiner

METHOD, COMPUTER PROGRAM PRODUCT AND MEASURING SYSTEM FOR OPERATING A TRIANGULATION LASER SCANNER TO IDENTIFY PROPERTIES OF A SURFACE OF A WORKPIECE TO BE MEASURED

CROSS REFERENCE TO RELATED APPLICATIONS

This application claims priority to German patent application DE 10 2016 218 056.8, filed Sep. 21, 2016, the entire content of which is incorporated herein by reference. In the case of inconsistencies between the disclosure in German patent application DE 10 2016 218 056.8 and the present disclosure, the present disclosure will prevail.

TECHNICAL FIELD

The invention relates to a method, a computer program product and a measuring system for operating a triangulation laser scanner to identify properties of a surface of a workpiece to be measured, the triangulation laser scanner having at least one complementary metal-oxide-semiconductor (CMOS) sensor chip.

BACKGROUND

Triangulation laser scanners for capturing surface coordinates of a workpiece to be measured are well known from the related art. The latest triangulation laser scanners use a CMOS sensor chip, which makes it possible for image files to be captured in so-called HDR formats. With the triangulation laser scanners, to evaluate the surface coordinates of a workpiece to be measured, the lateral deviation of the image position of a laser line with respect to its nominal position on the sensor chip is brought into a relationship with the distance of the triangulation laser scanner from the surface of the workpiece to be measured by classic triangulation. As a consequence, with triangulation laser scanners, only a lateral X and Y position of a bright pixel on the sensor chip is of importance. In particular, in the case of triangulation laser scanners with a Scheimpflug arrangement of the laser light plane, the lens plane of the imaging system, and the receiver plane of the CMOS sensor chip in relation to one another, only those surface points of the workpiece to be measured that are located in the laser light plane are projected as sharp images onto the CMOS sensor. All other surface points of the workpiece to be measured are not projected as an image at all. Consequently, with triangulation laser sensors with a Scheimpflug arrangement, only those X and Y positions that correspond to a point of intersection of the laser light plane with a surface point of the workpiece can be captured as two-dimensional data on the sensor chip.

Apart from such triangulation laser scanners, all possible forms of barcode readers, starting from the barcode reading pen to the camera scanner or mobile phone scanner, are know from the related art. Furthermore, the use of a barcode scanner for volume measurement is known from U.S. Pat. No. 6,260,001 B1. The simple barcode readers may just read one-dimensional barcodes, whereas camera or mobile phone scanners even read two-dimensional barcodes. In this respect, obtained items of pixel information or image files of the readers are evaluated by known evaluation methods for barcode recognition or by known methods of image processing. Apart from the lateral X and Y position of a bright image point, the brightness of the image point on the sensor chip of a barcode reader is also of importance for the evaluation of the barcode. For this reason, barcode evaluations in the related art generally depend on complete image files of the sensor chip, in which all pixels of the sensor area of the sensor chip are read out, and the barcode evaluations in the related art cannot use the typical data of a triangulation laser scanner, as further explained below.

Apart from triangulation laser scanners and barcode readers, cameras, in particular color cameras, are also known for capturing a texture of surfaces in 3D coordinate measurements, see U.S. Pat. No. 8,284,240 B2. The two-dimensional data of such color cameras are generally used to make the obtained 3D data correspond to the associated surface texture in the visualization with respect to the user. The surface texture may constitute here just the color of the surface. It is also possible, however, to detect other properties of the surfaces, such as the roughness of the surface texture. In this regard, it is possible for example to take into account for visualization of smooth glass surfaces of the workpiece be measured to the user, that the associated 3D data of the glass surface are displayed in blue color. In the same way as barcode readers for the detection of two-dimensional barcodes, such cameras for capturing the texture of surfaces depend on the two-dimensional sensor chip receiving a complete two-dimensional data record of the sensor area that can be investigated for the presence of barcode information and/or for the presence of texture information on the basis of its brightness or color information content.

In contrast to cameras for texture detection and in contrast to barcode readers for capturing 3D coordinates of surfaces, the sensor chips of triangulation laser scanners are read out with high clock frequencies to make a rapid scanning of the surfaces possible. In this respect, a reduction of the amount of data is desirable. To reduce the amount of data, generally only the data with respect to the lateral X, Y position of the bright image points and a quality criterion for each of the bright image points is transferred. Consequently, only the "bright" fraction of the two-dimensional data record of the overall sensor area is used. The quality criterion serves in this case for marking a measured value or a measuring point as valid or invalid for an evaluation. As already mentioned earlier, in particular when using triangulation laser scanners with a Scheimpflug arrangement, only such reduced data are captured, since only the points within the laser light plane are projected as a sharp image. This reduced amount of data is far less extensive than the complete two-dimensional data record of a sensor image, as a result of which this reduced data record can also be transferred with high clock rates. However, the data transferred up until now of triangulation laser scanners in the related art cannot be evaluated by barcode evaluations and/or texture evaluations of the related art with regard to the presence of barcode information and/or with regard to the presence of texture information because the lateral X, Y position data of the captured laser lines do not contain corresponding items of information.

SUMMARY

An object of the present invention is therefore to provide a method, a computer program product and a measuring system for operating at least one triangulation laser scanner, where at the same time as the operation of the triangulation laser scanner for capturing surface coordinates, an identification of the surface of the workpiece to be measured on the basis of a barcode and/or on the basis of a texture is possible.

The object is achieved by providing a method for operating at least one triangulation laser scanner to identify properties of a surface of a workpiece to be measured by the at least one triangulation laser scanner, including the following steps:

providing the at least one triangulation laser scanner, the at least one triangulation laser scanner having a metal-oxide-semiconductor (CMOS) sensor chip, an imaging optical unit and a laser line light source configured to generate a laser line on the workpiece to be measured, the CMOS sensor chip and the laser line light source being arranged relative to the imaging optical unit in compliance with a Scheimpflug condition;

providing the workpiece to be measured, the surface of the workpiece to be measured having at least two different regions, the at least two different regions including at least one of a region with different textures, a barcode region, and a detection code region;

capturing the surface of the workpiece to be measured by the at least one triangulation laser scanner by moving the at least one triangulation laser scanner relative to the workpiece to be measured or moving the workpiece to be measured relative to the at least one triangulation laser scanner, and by passing over at least a part of the surface of the workpiece by the laser line and thereby capturing actual lateral positions of image points of the laser line on the CMOS sensor chip;

restricting an amount of data generated on the CMOS sensor chip in an image recording to a reduced amount of data, the reduced amount of data including data of the actual lateral positions of the image points of the laser line and data of at least one quality criterion for each of the image points of the laser line, the at least one quality criterion being a measure of an intensity distribution along a direction transverse to a local direction of extent of the image points of the laser line on the CMOS sensor chip;

transferring the reduced amount of data to at least one evaluation unit at a clock rate greater than a maximum possible clock rate for reading out data of all of the pixels on the CMOS sensor chip;

generating surface coordinates of the workpiece to be measured based on the image points of the laser line captured on the CMOS sensor chip by the at least one evaluation unit, the surface coordinates being calculated based on lateral offsets of captured actual positions of the image points relative to nominal positions of the image points of the laser line; and analyzing the reduced amount of data with respect to the quality criterion by the at least one evaluation unit to determine whether at least one of the barcode region, the detection code region, and the region with the different textures is present.

According to an aspect of the invention, it has been recognized that the quality criterion contained in the reduced amounts of data of a triangulation laser scanner is sufficient when using a CMOS sensor chip for ensuring an analysis with regard to the presence of barcode and/or texture information. The great dynamic range of a laser scanner with a CMOS sensor chip (for example as a result of integrated HDR methods such as alternating recording with at least 2 different exposure times, a non-linear characteristic or an exposure time of the camera that differs column by column) has the result that, even with a barcode sticker with glossy surfaces or even with smooth texture properties of the surface such as for example in the case of painted vehicle body parts, marginal differences in the reflection behavior of the surface are retained in the brightness values of the recorded sensor image or are even enhanced by the non-linearity. According to another aspect of the invention, it has additionally been recognized that the differences in brightness enhanced by the non-linear response behavior of the CMOS sensor chip are also retained subsequently during the data reduction necessary for the scanning of surfaces, in the quality criterion that is respectively applied. Within the scope of the present invention, the term barcode information is not restricted to one-dimensional barcode information but also includes in particular two-dimensional barcode information, such as for example a 2D QR code or a plurality of barcodes.

Further within the scope of the present invention, the term image point (of the laser line on the CMOS sensor) is a term of mathematical representation of a point of the one-dimensional laser line on the CMOS sensor, for which X- and Y-coordinate data could be evaluated from the recorded intensity data of the pixel of the CMOS sensor. In this respect, reference is also made to FIG. 3 and FIG. 4 and to the associated description of United States Patent Application Publication No. 2011/0267431 which is incorporated herein by reference. In the case of inconsistencies between the disclosure in United States Patent Application Publication No. 2011/0267431 and the present disclosure, the present disclosure will prevail. Therefore, an image point of the laser line should not be confused with a pixel of the laser line. It goes without saying that the present invention is not restricted to the method described within United States Patent Application Publication No. 2011/0267431 as the only way to obtain image point data from intensity data of the pixels.

In one exemplary embodiment, a criterion is utilized from the group of: a lateral peak height, a lateral peak width, a ratio of the lateral peak height to the lateral peak width, a full width at half maximum (FWHM) lateral, a maximum lateral gradient, a number of lateral pixels in saturation or over a threshold value, and an integral peak value in the lateral direction. In addition, a convolution of the intensity distribution of the captured lateral pixels of the laser line on the CMOS sensor chip is used for this purpose as the at least one quality criterion according to an exemplary embodiment of the invention. "Lateral" is understood here as a direction transverse or perpendicular to the direction of extent of the laser line projected as an image on the CMOS sensor chip. In the case of a triangulation laser scanner with a Scheimpflug arrangement, only the laser line is projected as a sharp image on the workpiece to be measured, so that this "sharp" imaging only concerns a few pixels in the lateral or perpendicular direction in relation to the direction of extent of the image of the laser line on the CMOS sensor. The lateral peak height is therefore defined by the maximum intensity along these few lateral pixels. Lateral peak width defines the total number of the few lateral pixels with an intensity (possibly over a noise threshold value). The ratio of the lateral peak height to the lateral peak width is accordingly self-explanatory. FWHM lateral means a corresponding statistical determination of the FWHM along the few lateral pixels. The maximum lateral gradient defines the maximum gradient of the lateral intensity distribution along the few lateral pixels. The number of lateral pixels in saturation or over a threshold value is in turn self-explanatory. The integral peak value in the lateral direction means here the integral over the intensity distribution along the few lateral pixels. Furthermore, the convolution of the intensity distribution of the captured lateral pixels of the laser line on the CMOS sensor chip also defines that a convolution integral of the intensity distribution along the few lateral pixels likewise comes into consideration as a measure of the intensity distribution.

When applying the quality criteria mentioned, the increased difference in the brightness values of adjacent scanning points of the workpiece surface thanks to the non-linearity of the CMOS sensor chip is retained. This also applies to those criteria in the case of which a weighting, summation or integration takes place, since these operations mentioned only take place in the scanning direction or along a direction transverse to the local direction of extent of the image points of the laser line on the CMOS sensor chip.

In a further exemplary embodiment of the method according to an aspect of the invention, data with regard to the barcode and/or detection code information and/or the texture information of the captured surface that correspond to the information content of the items of information contained in the barcode and/or detection code information and/or the texture information of the captured surface are generated based on the quality criterion of the reduced amount of data. These corresponding data allow the component to be measured and/or the surface regions thereof to be identified based on the information established.

In one exemplary embodiment of the method according to an aspect of the invention, the generated data are visualized or displayed to a user together with a representation of the surface coordinates of the captured surface. In this way, a three-dimensional representation of the surface to be measured that also corresponds to the visual perception of the surface by the user is presented to the user, for example on a monitor or display.

In a further exemplary embodiment of the method according to an aspect of the invention, after establishing the presence of a barcode and/or detection code, an examination schedule or plan for the examination of the workpiece that corresponds to the code is selected. This has the advantage that the user is relieved of the necessity of correctly choosing an examination schedule matching the component to be measured. After establishing the presence of an examination schedule, the correct examination schedule is read automatically into the at least one evaluation unit or semi-automatically after confirmation of the proposed examination plan by the user. On the basis of the examination schedule, a quality control of the workpiece to be measured can then be performed by the evaluation unit or by the evaluation unit and the user. Consequently, even persons who are inexperienced in quality assurance can use the method according to the aspect of the invention for measuring components.

In one exemplary embodiment of the method according to an aspect of the invention, the transfer of the reduced amount of data to the evaluation unit takes place wirelessly. This makes it possible to also measure a workpiece that is far away from the evaluation unit.

In a further exemplary embodiment, the at least one evaluation unit may process reduced amounts of data of a number of triangulation laser scanners in parallel. This makes it possible in a production line with a number of triangulation laser scanners to measure at the same time a relatively large component, such as for example the body of a truck or of an aircraft, with only one evaluation unit and to merge the surface data by the at least one evaluation unit.

In one exemplary embodiment of the method according to an aspect of the invention, at least one external measuring system is provided for referencing the at least one triangulation laser scanner relative to the workpiece, and the at least one evaluation unit puts together the reduced amounts of data of the at least one triangulation laser scanner and/or of a number of triangulation laser scanners on the basis of the referencing information of the external measuring system positionally correctly, so that the put-together reduced amounts of data can be analyzed with respect to the quality criterion regarding the presence of barcode information and/or texture information. It is ensured by at least one external measuring system for referencing the at least one triangulation laser scanner that the data of the at least one triangulation laser scanner can be analyzed positionally correctly in the global coordinate system of the at least one evaluation unit.

The object of the present invention is also achieved by providing a computer program product including executable instructions stored on a non-transitory computer readable storage medium for carrying out the method according to an aspect of the invention on the basis of one of the aforementioned exemplary embodiments on at least one control or evaluation unit in conjunction with a triangulation laser scanner having a CMOS sensor chip, an imaging optical unit and a laser line light source configured to generate a laser line on a workpiece to be measured, the CMOS sensor chip and the laser line light source being arranged relative to the imaging optical unit in compliance with the Scheimpflug condition.

In addition, the object of the present invention is achieved by providing a measuring system including the aforementioned computer program product and at least one triangulation laser scanner having a CMOS sensor chip, an imaging optical unit and a laser line light source configured to generate a laser line on a workpiece to be measured, the CMOS sensor chip and the laser line light source being arranged relative to the imaging optical unit in compliance with the Scheimpflug condition.

BRIEF DESCRIPTION OF THE DRAWINGS

The invention will now be described with reference to the drawings wherein.

DESCRIPTION OF EXEMPLARY EMBODIMENTS

Figure 1:
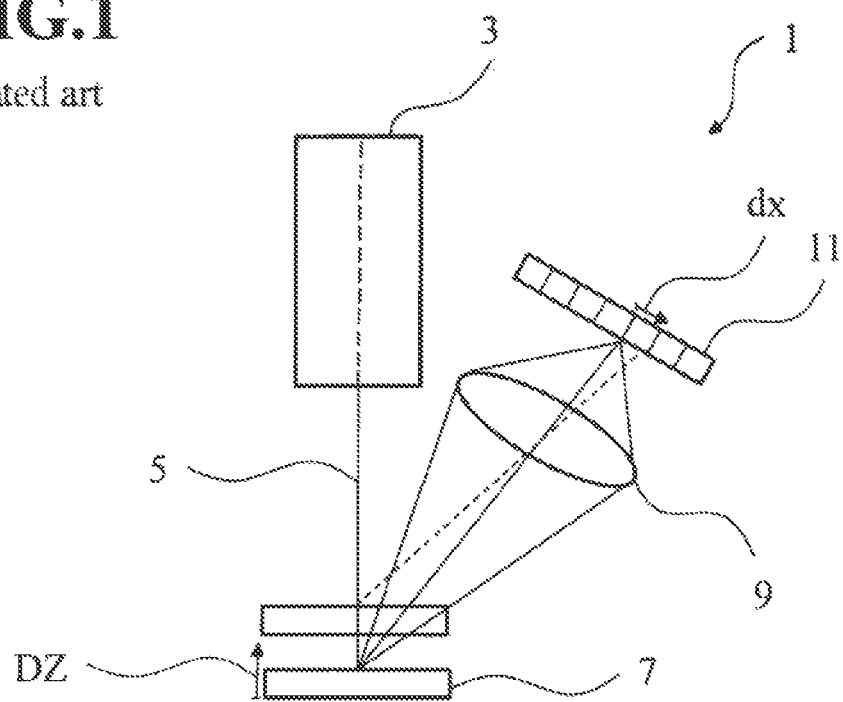
FIG. 1 shows a schematic representation of a triangulation laser scanner in the related art.

FIG. 1 shows a schematic representation of a triangulation laser scanner 1 of the related art. Such a laser scanner has a laser light source 3, the laser light of which is generally fanned out into a laser plane by an illumination optical unit. This laser plane extends in FIG. 1 perpendicularly to the plane of the paper so that only a vertical line 5 of this fanned-out laser plane is depicted in FIG. 1. This depicted line 5 must not be confused with the lateral laser line on the workpiece 7 to be measured, which extends laterally within the laser plane and consequently perpendicularly in relation to the plane of the paper. The measuring range of such a triangulation laser scanner 1 thus extends in the horizontal direction with respect to FIG. 1 along the central region of the fanned-out laser plane of the laser light source 3 and in the vertical direction with respect to FIG. 1 between the minimum distance and the maximum distance of a workpiece 7 to be measured with respect to the laser light source 3 for which a distance measurement is still meaningfully possible.

In the case of the distance measurement by such a triangulation laser scanner 1 of the related art, the laser light of the laser plane that is incident on a workpiece 7 to be measured is recorded by an imaging optical unit 9 and a charge-coupled device (CCD) or CMOS sensor chip 11. The incident laser light extends along a laser line within the laser plane in a way corresponding to the surface profile of the workpiece 7 to be measured.

The recording of this laser line by the sensor chip 11 thus takes place at a predefined angle between the laser light source 3 and the sensor chip 11, so that the distance of the workpiece 7 to be measured from the laser light source 3 can be determined by triangulation based on the offset dx of the actual position of the recorded laser line on the sensor chip 11 with respect to the nominal position on the sensor chip 11. In other words, the difference in height DZ of the laser line between two locations of the surface of the workpiece 7 to be measured is projected onto the offset dx between the two recording locations of the laser line on the sensor chip 11. Based on these offset data of the laser line, the height profile can thus be determined for the line of intersection of the laser plane with the workpiece to be measured.

By combining a number of such adjacent profiles, for example by scanning the workpiece 7 by the triangulation laser scanner 1, a 3D model of the surface of the workpiece 7 can subsequently be obtained in the form of a point cloud. For this purpose, the triangulation laser scanner 1 can be moved manually, by a coordinate measuring machine or robot or in some other way relative to the workpiece 7 to be measured, or vice versa.

Triangulation laser scanners of the related art are generally constructed in compliance with the Scheimpflug condition. Being in compliance with the Scheimpflug condition means that the image plane, the object plane and the lens plane all intersect in one and the same straight line. In the case of a triangulation laser scanner, the object plane is given by the laser plane of the laser light source and the image plane is given by the plane of the sensor chip. The principal plane of the lens is considered to be the lens plane. However, most lenses have two principal planes, an object-side principal plane and an image-side principal plane. The Scheimpflug rule therefore states more precisely that the focal plane intersects with the object-side principal plane at the same distance from the axis of the lens as the image plane intersects with the image-side principal plane, and that the two lines of intersection are parallel to one another. Here, the two lines of intersection are on the same side of the optical axis.

Triangulation laser scanners with a Scheimpflug arrangement offer the advantage that the entire laser plane of the measuring range is projected as an equally sharp image onto the sensor chip by the imaging optical unit and that, as a result, identical conditions prevail within the entire measuring range with regard to the imaging. As an alternative to a Scheimpflug arrangement, when using freeform optics, it is also possible to project a sharp image of multiple distances of a plane onto a sensor chip.

The Scheimpflug arrangement also has the effect that points of a surface to be measured that are outside the laser plane of the triangulation laser scanner are no longer projected as a sharp image onto the sensor chip by the imaging optical unit. Consequently, only the points within the laser plane can be captured by a triangulation laser scanner with a Scheimpflug arrangement.

Figure 3:
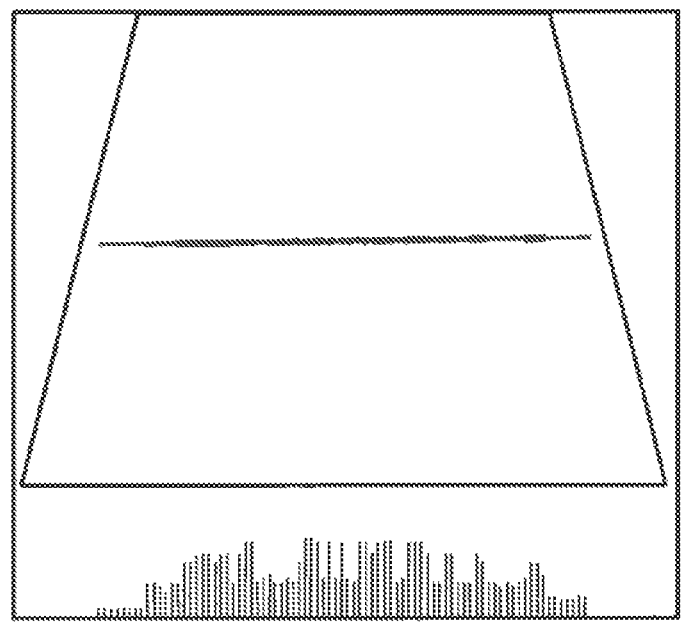
FIG. 3 shows a representation of a working range of a triangulation laser scanner as a trapezoidal area of the laser line plane on the CMOS sensor chip and a measuring line of a flat workpiece to be measured that is recorded by a method according to an exemplary embodiment of the invention.
Figure 4:
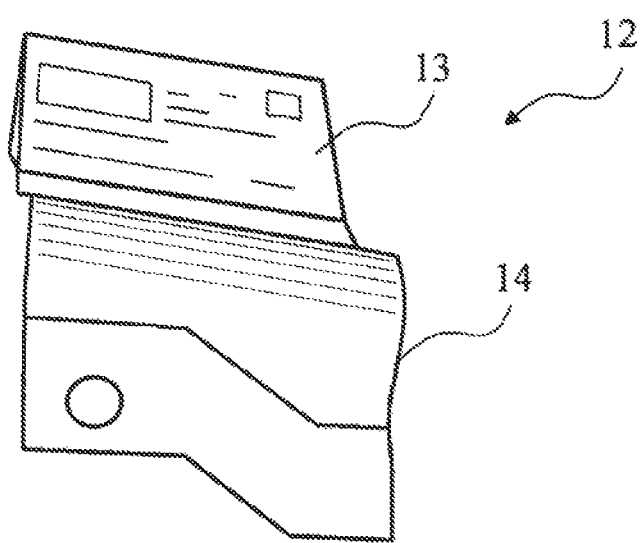
FIG. 4 shows a representation of a two-dimensional projection of obtained three-dimensional surface coordinates of a workpiece to be measured provided with greyscale values that result from an analysis of the quality criterion according to an exemplary embodiment of the invention.

In this respect, reference is also made to FIG. 3 and FIG. 4 and to the associated description of United States Patent Application Publication No. 2011/0267431.

Figure 2:
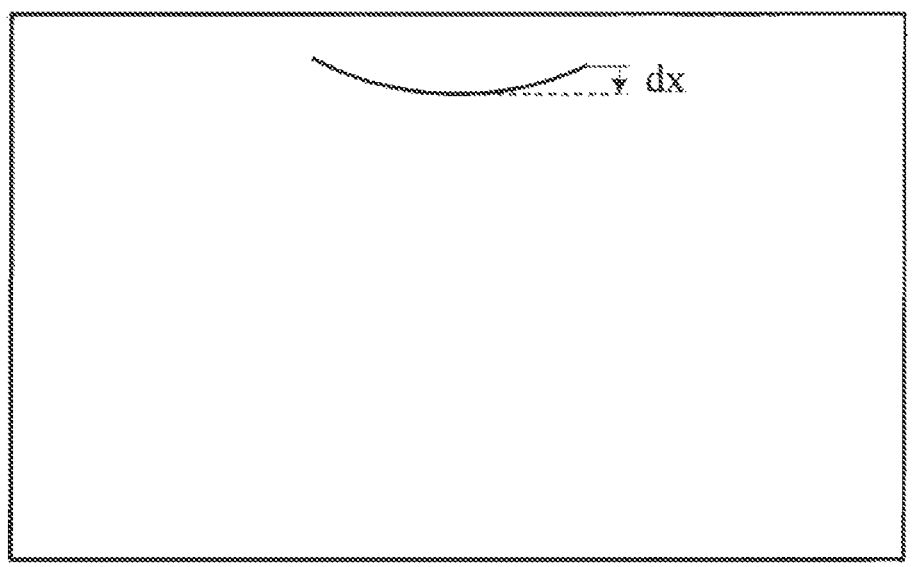
FIG. 2 shows a representation of the pixels of the CMOS sensor chip of a triangulation laser scanner in the related art with a Scheimpflug arrangement during the recording of a laser line reflected by a spherical surface.

FIG. 2 shows a representation of a single recording of a laser line in a measurement of a spherical surface by a triangulation laser scanner of the related art with a Scheimpflug arrangement. As can be seen in FIG. 2, only points of the intersection of the laser plane with the spherical surface have been projected onto the sensor chip in this individual recording. All other points of the spherical surface cannot be projected as a sharp image onto the sensor chip, and for this reason, they are also not visible in the individual recording. The image of the laser line in FIG. 2 includes several thousand pixels or even more in the direction of extent of the laser line. By contrast, perpendicularly or transversely to this direction of extent, the image of the laser line is restricted to a few lateral pixels. The original of the individual recording depicted in FIG. 2 shows a black image in which only the recorded laser line is a bright curve. To ensure that the publication of FIG. 2 is proper, the original brightness values of the original recording were inverted in FIG. 2.

In the individual recording according to FIG. 2, the spherical surface of the workpiece 7 to be measured was placed below the triangulation laser scanner 1, as shown in FIG. 1. Accordingly, in the individual recording of FIG. 2, the vertex of the laser line on the spherical surface is closer by the amount DZ to the triangulation laser scanner 1 than the outer points of the laser line. For this reason, the actual position of the vertex of the laser line in the individual recording of FIG. 2 is reduced by the amount dx in comparison with the outer points of the laser line. See also in this respect the explanations relating to FIG. 1.

FIG. 3 shows a representation of an individual recording of a laser line in a measurement of a flat sheet-metal part 12 as a workpiece 7 to be measured that corresponds to the representation of the individual recording in FIG. 2. The sheet-metal part 12 has a barcode sticker 13, which has been intentionally hit in the individual recording of the laser line for the representation of FIG. 3. A trapezoidal measuring range of the triangulation laser scanner 1 is also depicted in FIG. 3. This trapezoidal measuring range extends perpendicularly to the plane of the drawing of FIG. 1 along the laser line 5. In the case of FIG. 3, the relative intensities have likewise been inverted in comparison with the original recording in a way corresponding to FIG. 2 to ensure publication of FIG. 3 in accordance with regulations. The original recording of FIG. 3 shows a black trapezoid with bright pixels of the laser line.

In FIG. 3, a quality criterion has been applied according to an exemplary embodiment of the invention for the representation of the laser line on the CMOS sensor chip 11 based on greyscale values within the measuring range. Here, the quality criterion may be a criterion from the group of: a lateral peak height, a lateral peak width, a ratio of the lateral peak height to the lateral peak width, an FWHM lateral, a maximum lateral gradient, a number of lateral pixels in saturation or over a threshold value, an integral peak value in the lateral direction and also a convolution of the intensity distribution of the captured lateral pixels of the laser line on the CMOS sensor chip. The criterion that is specifically applied in FIG. 3, namely the "lateral peak height", is plotted here in the form of the maximum lateral intensity in the lower part of FIG. 3 along the laser line. Based on the pattern occurring here in FIG. 3, it is already possible to conclude the presence of a barcode in contrast to the presence of a homogeneous texture of a uniform surface.

It should be noted here that until now, with triangulation laser scanners of the related art, only the position data of the laser line on the sensor chip have been transferred to an evaluation unit. See also in this regard FIGS. 3 and 4 of United States Patent Application Publication No. 2011/0267431 and the associated description. Until now, a quality criterion in the form of a measure of the intensity distribution has only served the purpose of deeming a measurement or a measuring point to be valid or invalid. A content-related evaluation of a quality criterion therefore did not take place.

FIG. 4 shows a two-dimensional representation of a sheet-metal part 12 as a workpiece 7 to be measured, the sheet-metal part 12 having a flat portion with a barcode region 13. The remaining region 14 of the sheet-metal part 12 has a bare surface. The barcode region 13 shown in FIG. 4 has been provided on the sheet-metal part 12 to be measured by a barcode sticker which was additionally attached to the sheet-metal part 12 for test purposes. With respect to this flat portion with a barcode region 13, FIG. 3 discussed above shows an individual recording of a laser line measurement by a triangulation laser scanner with a Scheimpflug arrangement.

As illustrated in FIG. 4, several individual recordings of the sheet-metal part 12 were put together positionally correctly in a way corresponding to FIG. 3 so that items of height information for the laser line sections along the surface of the sheet-metal part were obtained from the X and Y positions of the image points. These individual items of height information of the individual recordings were transferred into a global coordinate system of an evaluation unit with the aid of an external referencing of the triangulation laser scanner. A coordinate measuring device may serve here as the external referencing of the triangulation laser scanner. It is also possible to fasten the triangulation laser scanner to a so-called rotary swivel joint for spatial alignment as desired. With the aid of such a coordinate measuring device, the position and the attitude of the triangulation laser scanner can consequently be established for each individual recording and can be transferred to the evaluation unit for putting together the individual recordings positionally correctly. Similarly, robot systems can conceivably perform this task. Furthermore, external referencing systems according to FIG. 1 of United States Patent Application Publication No. 2011/0267431 can also be used for this purpose for handheld triangulation laser scanners.

Consequently, three-dimensional point clouds of the surface of the workpiece to be measured that have been put together positionally correctly are generated by the at least one evaluation unit. Each point of these point clouds can be assigned a greyscale value corresponding to the quality criterion. They can then be used for reproducing two-dimensional representations of the surface in a way corresponding to FIG. 4, the reproduced greyscale values of the two-dimensional representation corresponding to the determined greyscale values from the quality criterion.

Figure 5:
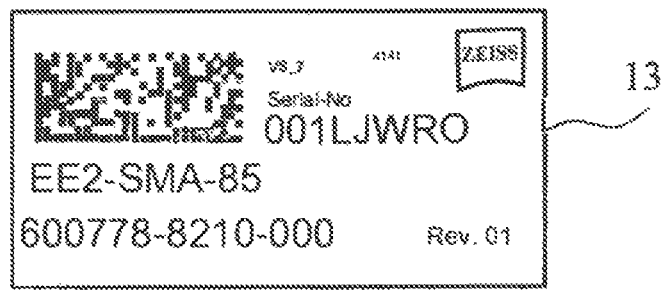
FIG. 5 is a representation of a two-dimensional detail showing a barcode region of FIG. 4.

FIG. 5 shows a two-dimensional detail of the representation shown in FIG. 4 concerning the barcode region 13 of the sheet-metal part to be measured. From the data for generating FIG. 4, corresponding two-dimensional regions can then be generated that have been identified as barcode regions. The data of these regions corresponding to FIG. 5 can subsequently be investigated by standard software from known libraries regarding the one-dimensional or two-dimensional barcode content. Additionally, or alternatively, the data of these regions may be investigated by speech recognition software, for example by optical character recognition (OCR), for the presence of speech information.

Figure 6:
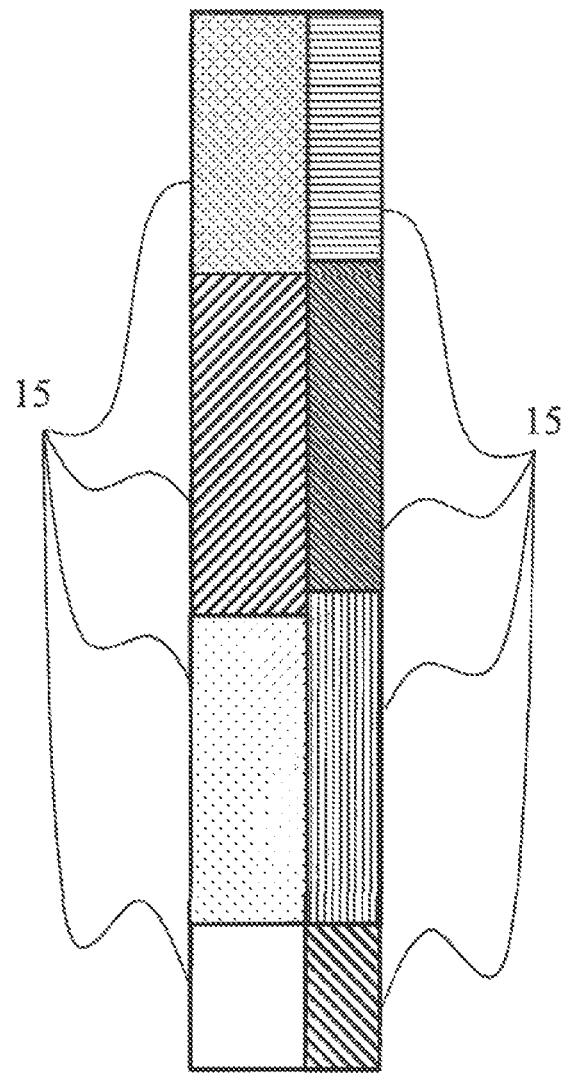
FIG. 6 shows a representation of a measurement of various materials with textures that differ from one another.

FIG. 6 shows a representation of a perpendicular measurement of various panels of different materials to demonstrate the functional capability of the method according to an exemplary embodiment of the invention with regard to the capturing of different items of texture information. The panels of aluminum, steel (X8), two of copper with different degrees of shine, black rubber (sealing material), beige plastic and dark-grey plastic were placed on the workpiece table of a coordinate measuring device 20 for the measurement. The coordinate measuring machine 20 was equipped with a triangulation laser scanner 1 of the related art in compliance with a Scheimpflug arrangement. The surfaces of the panels were then scanned by the triangulation laser scanner 1 of the related art with the Scheimpflug arrangement, and an associated quality criterion of the captured laser lines on the CMOS sensor chip was evaluated according to an exemplary embodiment of the invention. The quality criterion used here was the "number of lateral pixels in saturation plus twice the lateral peak height and plus the lateral peak width". The greyscale values of the two-dimensional representation that were obtained thereby, and also FIGS. 2 to 5, all of which as well as FIG. 6 are based on measurements actually carried out in accordance with the method according to the exemplary embodiment of the invention, were revised by a drawing office to comply with formal requirements. FIG. 6 consequently represents the revised image of the two-dimensional representation of the greyscale values in a way corresponding to the quality criterion mentioned for the measurement of the various panels.

As shown in FIG. 6, on the one hand, surface regions of a component of different materials such as aluminum, steel and rubber can be distinguished from one another with the aid of the method according to the exemplary embodiment of the invention. In addition, however, on the other hand, different degrees of shine in the case of one and the same material, such as for example copper, or different colors of the surface regions in the case of one and the same material, such as for example plastic, can be distinguished with the aid of the method according to the exemplary embodiment of the invention.

Figure 7:
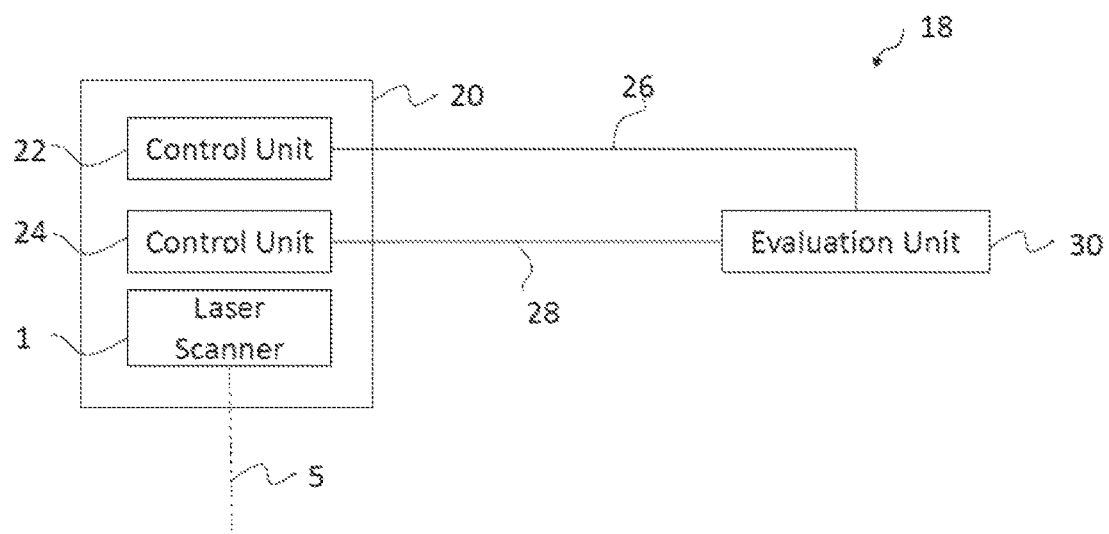
FIG. 7 shows a schematic representation of the data recording by a measuring system according to an exemplary embodiment of the invention.

FIG. 7 shows a schematic representation of the data recording by the measuring system 18 according to an exemplary embodiment of the invention. The measuring system 18 in FIG. 7 according to the exemplary embodiment of the invention includes a coordinate measuring device 20 with a control unit 22 configured to control the coordinate measuring device 20 and a further control unit 24 configured to control the triangulation laser scanner 1, the control units 22 and 24 including one or more processors and at least one non-transitory computer readable storage medium (not shown) with instructions stored thereon to be executed by the one or more processors. These control units 22, 24 may, however, also be provided in one unit. For measuring a workpiece 7, the triangulation laser scanner 1 generates a laser light plane, of which only a line 5 is depicted in FIG. 7. See also in this respect the description of the other figures in conjunction with FIG. 1. The coordinate measuring device 20 with its control unit 22 is configured to position and positionally correctly align the triangulation laser scanner 1 relative to the workpiece 7 to be measured. The control unit 22 thereby passes on machine data 26 to an evaluation unit 30. These machine data 26 include the position and alignment data of the triangulation laser scanner 1 within the coordinate system of the coordinate measuring device 20. The further control unit 24 of the coordinate measuring device 20 provides on the one hand control over the triangulation laser scanner 1 itself and on the other hand a reduction of the data occurring at the sensor chip 11 of the triangulation laser scanner 1 to just those data of the lateral actual position of the image points of the laser line and the data of at least one quality criterion for each of the image points of the captured laser line. This reduced amount of data 28 is likewise passed on by the further control unit 24 to the at least one evaluation unit 30. The evaluation unit 30 generates the surface coordinates of the workpiece to be measured based on the image points of the laser line captured on the CMOS sensor chip 11, the surface coordinates being calculated based on the lateral offset of the captured actual position of the image points with respect to the nominal position of the image points of the laser line. The data of the triangulation laser scanner 1 are put together here positionally correctly based on the machine data 26 of the coordinate measuring device 20.

The triangulation laser scanner 1 of FIG. 7 of the coordination measuring device 20 is configured to receive the data represented in FIGS. 2 to 6 and has a CMOS sensor chip 11, an imaging optical unit 9 and a laser line light source 3 for generating a laser line on a workpiece 7 to be measured, the CMOS sensor chip 11 and the laser line light source 3 being arranged relative to the imaging optical unit 9 in compliance with aScheimpflug condition.

Figure 8:
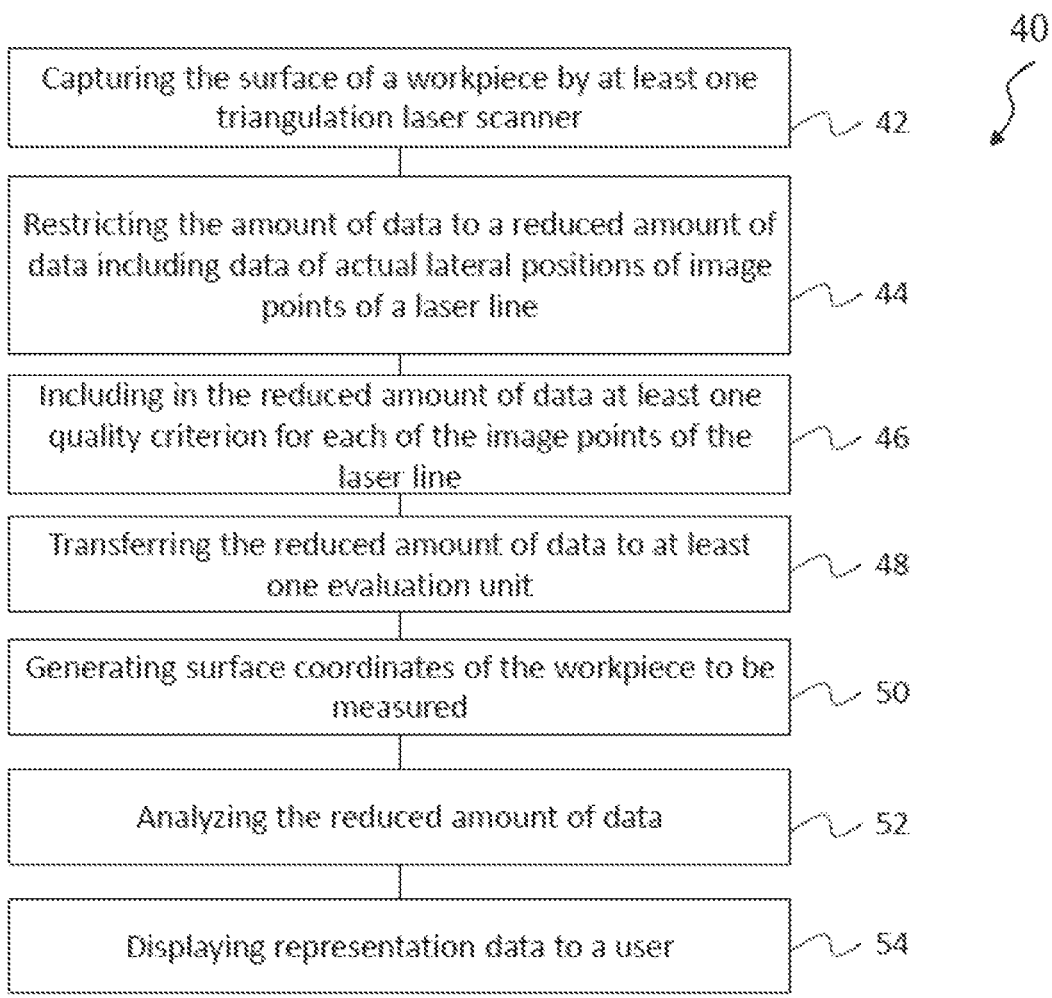
FIG. 8 shows a flow chart of a method according to an exemplary embodiment the invention.

FIG. 8 schematically shows a method 40 according to an exemplary embodiment of the invention for operating at least one triangulation laser scanner 1 to identify surface properties of a workpiece 7 to be measured by the at least one triangulation laser scanner 1. Method 40 includes the following steps:

providing at least one triangulation laser scanner 1, the at least one triangulation laser scanner 1 having a CMOS sensor chip 11, an imaging optical unit 9 and a laser line light source 3 for generating a laser line on the workpiece 7 to be measured, the CMOS sensor chip 11 and the laser line light source 3 being arranged relative to the imaging optical unit 9 in compliance with the Scheimpflug condition;

providing a workpiece 7 of which the surface to be measured has at least two different regions 13, 14; 15 with different textures 15 and/or at least one barcode and/or detection code region 13;

capturing the surface (step 42) of the workpiece 7 to be measured by the at least one triangulation laser scanner 1 by relative movement of the at least one triangulation laser scanner 1 relative to the workpiece 7 to be measured, or vice versa, whereby at least part of the surface of the workpiece 7 is passed over by the laser line and the lateral actual position of the image points of the laser line is thereby captured on the CMOS sensor chip 11;

restricting the amount of data generated on the CMOS sensor chip 11 in an image recording to a reduced amount of data that merely includes the data of the lateral actual position of the image points of the laser line (step 44) and the data of at least one quality criterion for each of the image points of the laser line captured (step 46), the quality criterion being a measure of the intensity distribution along a direction transverse to the local direction of extent of the image points of the laser line on the CMOS sensor chip;

transferring (step 48) the reduced amount of data to an evaluation unit 30 at a clock rate which is greater than the maximum possible clock rate for reading out all of the pixel data of the entire CMOS sensor chip 11;

generating surface coordinates (step 50) of the workpiece 7 to be measured based on the image points of the laser line captured on the CMOS sensor chip 11 by the at least one evaluation unit 30, the surface coordinates being calculated based on the lateral offset of the captured actual position of the image points with respect to the nominal position of the image points of the laser line; and analyzing the reduced amount of data (step 52) with respect to the quality criterion by the evaluation unit 30 with regard to the presence of barcode and/or detection code information 13 and/or texture information 15.

A criterion can be chosen here as the at least one quality criterion from: a lateral peak height, a lateral peak width, a ratio of the lateral peak height to the lateral peak width, a FWHM lateral, a maximum lateral gradient, a number of lateral pixels in saturation or over a threshold value, an integral peak value in the lateral direction and also a convolution of the intensity distribution of the captured lateral pixels of the laser line on the CMOS sensor chip. It is important that the quality criterion can be used to form a measure of the intensity distribution along a direction transverse to the local direction of extent of the image points of the laser line on the CMOS sensor chip that retains during the formation of the quality criterion the differences in brightness in the intensity values that are present on account of the non-linear brightness sensitivity of the CMOS sensor chip.

In the case of the method 40 according to the exemplary embodiment of the invention, data regarding the barcode and/or detection code information 13 and/or the texture information 15 of the captured surface that correspond to the information content of the items of information contained in the barcode and/or detection code information 13 and/or the texture information 15 of the captured surface can be generated based on the quality criterion of the reduced amount of data. These corresponding data can be used for the purpose of identifying the component and/or the surface regions thereof on the basis of the information established.

FIGS. 5 and 6 represent corresponding data with regard to barcode and/or detection code information 13 and/or the texture information 15 of the captured surface.

In a further step 54 of the method 40 according to the exemplary embodiment of the invention, the generated data can be visualized to a user together with a representation of the surface coordinates of the captured surface. For this purpose, first the generated data must be combined positionally correctly with the data of the captured surface coordinates. Subsequently, the data can then be output, for example, on a monitor, together with the surface coordinates. In this regard, reference is made to FIG. 4. In FIG. 4, both surface coordinates and items of barcode and/or detection code information 13 are reproduced in a representation.

In a refinement of the method 40 according to the exemplary embodiment of the invention, after establishing the presence of a barcode and/or detection code information 13 in step 52 of the method, an examination or test schedule for the examination of the workpiece 7 that corresponds to the code can be selected.

This makes it possible for example to visualize test features of the workpiece to be measured to the user at the same time the data of step 54 is visualized.

The transfer of the reduced amount of data in step 48 of the method 40 according to the exemplary embodiment of the invention to the at least one evaluation unit 30 can be performed wirelessly. In addition, the at least one evaluation unit 30 may process reduced amounts of data of a number of triangulation laser scanners 1 in parallel.

Furthermore, at least one external measuring system, for example the coordinate measuring device 20 of FIG. 7, may be provided for referencing the at least one triangulation laser scanner 1 relative to the workpiece, and the at least one evaluation unit 30 putting together the reduced amounts of data of the at least one triangulation laser scanner 1 and/or of a number of triangulation laser scanners 1 on the basis of the referencing information of the external measuring system positionally correctly, so that the put-together reduced amounts of data can be analyzed with respect to the quality criterion with regard to the presence of barcode and/or detection code information 13 and/or texture information 15. With the aid of such a coordinate measuring device 20 of FIG. 7 as an external measuring system, it has been possible for example to obtain the put-together reduced amounts of data of FIG. 4 or 5. In addition, it may, however, also happen when capturing surface coordinates of extensive workpieces, such as for example aircraft fuselages or wings, in step 42 of the method 40 according to the exemplary embodiment of the invention by a number of triangulation laser scanners 1 that are independent of one another that only one partial region of a barcode and/or detection code information 13 and/or texture information 15 is captured by one triangulation laser scanner 1 and the further partial regions or the remaining partial region is/are captured by another triangulation laser scanner 1. Here it is then necessary that at least one external measuring system acts together with at least one evaluation unit 30 in bringing together the captured data in a common coordinate system and that the at least one evaluation unit 30 investigates the brought-together data with respect to the quality criterion about the presence of barcode and/or detection code information 13 and/or texture information 15 in step 52 of the method 40 according to the exemplary embodiment of the invention.

In addition, the present invention includes a computer program product for carrying out the method 40 according to the exemplary embodiment of the invention as shown in FIG. 8 on at least one control or evaluation unit 30 in conjunction with a triangulation laser scanner 1 as shown in FIG. 7 having a CMOS sensor chip 11, an imaging optical unit 9 and a laser line light source 3 for generating a laser line on a workpiece 7 to be measured, the CMOS sensor chip 11 and the laser line light source 3 being arranged relative to the imaging optical unit 9 in compliance with the Scheimpflug condition.

It is understood that the foregoing description is that of the exemplary embodiments of the invention and that various changes and modifications may be made thereto without departing from the spirit and scope of the invention as defined in the appended claims.

What is claimed is:

1. A method for operating at least one triangulation laser scanner to identify properties of a surface of a workpiece to be measured by the at least one triangulation laser scanner, the method comprising:
   providing the at least one triangulation laser scanner, the at least one triangulation laser scanner having a metal-oxide-semiconductor (CMOS) sensor chip, an imaging optical unit and a laser line light source configured to generate a laser line on the workpiece to be measured, the CMOS sensor chip and the laser line light source being arranged relative to the imaging optical unit in compliance with a Scheimpflug condition;
   providing the workpiece to be measured, the surface of the workpiece to be measured having at least two different regions, the at least two different regions including at least one of a region with different textures, a barcode region, and a detection code region;
   capturing the surface of the workpiece to be measured by the at least one triangulation laser scanner by:
      moving the at least one triangulation laser scanner relative to the workpiece to be measured or moving the workpiece to be measured relative to the at least one triangulation laser scanner, and
      passing over at least a part of the surface of the workpiece by the laser line and thereby capturing actual lateral positions of image points of the laser line on the CMOS sensor chip;
   restricting an amount of data generated on the CMOS sensor chip in an image recording to a reduced amount of data, the reduced amount of data including data of the actual lateral positions of the image points of the laser line and data of at least one quality criterion for each of the image points of the laser line, the at least one quality criterion being a measure of an intensity distribution along a direction transverse to a local direction of extent of the image points of the laser line on the CMOS sensor chip;
   transferring the reduced amount of data to at least one evaluation unit at a clock rate greater than a maximum possible clock rate for reading out data of all of the pixels on the CMOS sensor chip;
   generating surface coordinates of the workpiece to be measured based on the image points of the laser line captured on the CMOS sensor chip by the at least one evaluation unit, the surface coordinates being calculated based on lateral offsets of captured actual positions of the image points relative to nominal positions of the image points of the laser line; and
   analyzing the reduced amount of data with respect to the quality criterion by the at least one evaluation unit to determine whether at least one of the barcode region, the detection code region, and the region with the different textures is present.

2. The method of claim 1, wherein the at least one quality criterion includes a lateral peak height, a lateral peak width, a ratio of the lateral peak height to the lateral peak width, a full width at half maximum (FWHM) lateral, a maximum lateral gradient, a plurality of lateral pixels in saturation, a plurality of lateral pixels over a threshold value, an integral peak value in a lateral direction, and a convolution of the intensity distribution of captured lateral pixels of the laser line on the CMOS sensor chip.

3. The method of claim 1, further comprising:
   generating representation data representing the at least one of the barcode region, the detection code region, and the region with the different textures of a captured surface based on the quality criterion of the reduced amount of data, wherein the representation data corresponds to a content of information included in the at least one of the barcode region, the detection code region, and the region with the different textures.

4. The method of claim 3, further comprising:
displaying the representation data to a user together with a representation of the surface coordinates of the captured surface.

5. The method claim 1, further comprising:
determining a presence of at least one of the barcode and the detection code; and
selecting a schedule for examination of the workpiece that corresponds to the at least one of the barcode and the detection code.

6. The method of claim 1, wherein the reduced amount of data is wirelessly transferred to the at least one evaluation unit.

7. The method of claim 1, wherein the at least one evaluation unit is configured to process reduced amounts of data of a plurality of triangulation laser scanners in parallel.

8. The method of claim 1, further comprising:
providing at least one external measuring system configured to reference the at least one triangulation laser scanner relative to the workpiece, and
positionally correctly merging at least one of the reduced amount of data of the at least one triangulation laser scanner and reduced amounts of data of a plurality of triangulation laser scanners by the at least one evaluation unit based on referencing information provided by the at least one external measuring system to generate merged reduced amounts of data and to permit the merged reduced amounts of data to be analyzed with respect to the quality criterion regarding a presence of the at least one of barcode information, detection code information, and texture information.

9. A computer program product for carrying out the method of claim 1 on at least one control unit or on the at least one evaluation unit in conjunction with the triangulation laser scanner having the CMOS sensor chip, the imaging optical unit and the laser line light source configured to generate the laser line on the workpiece to be measured, the CMOS sensor chip and the laser line light source being arranged relative to the imaging optical unit in compliance with the Scheimpflug condition.

10. A measuring system comprising:
the computer program product of claim 9; and
the at least one triangulation laser scanner having the CMOS sensor chip, the imaging optical unit and the laser line light source configured to generate the laser line on the workpiece to be measured, the CMOS sensor chip and the laser line light source being arranged relative to the imaging optical unit in compliance with the Scheimpflug condition.

11. A non-transitory computer readable storage medium encoded with computer executable instructions that when executed by one or more processors cause the one or more processors to:
capture the surface of a workpiece to be measured by at least one triangulation laser scanner by moving the at least one triangulation laser scanner relative to the workpiece to be measured or moving the workpiece to be measured relative to the at least one triangulation laser scanner, and passing over at least a part of the surface of the workpiece by a laser line and thereby capturing actual lateral positions of image points of the laser line on a metal-oxide-semiconductor (CMOS) sensor chip, the at least one triangulation laser scanner including the CMOS sensor chip, an imaging optical unit and a laser line light source configured to generate the laser line on the workpiece to be measured, the CMOS sensor chip and the laser line light source being arranged relative to the imaging optical unit in compliance with a Scheimpflug condition, and the surface of the workpiece to be measured having at least two different regions, the at least two different regions including at least one of a region with different textures, a barcode region, and a detection code region;
restrict an amount of data generated on the CMOS sensor chip in an image recording to a reduced amount of data, the reduced amount of data including data of the actual lateral positions of the image points of the laser line and data of at least one quality criterion for each of the image points of the laser line, the at least one quality criterion being a measure of an intensity distribution along a direction transverse to a local direction of extent of the image points of the laser line on the CMOS sensor chip;
transfer the reduced amount of data to at least one evaluation unit at a clock rate greater than a maximum possible clock rate for reading out data of all of the pixels on the CMOS sensor chip;
generate surface coordinates of the workpiece to be measured based on the image points of the laser line captured on the CMOS sensor chip by the at least one evaluation unit, the surface coordinates being calculated based on lateral offsets of captured actual positions of the image points relative to nominal positions of the image points of the laser line; and
analyze the reduced amount of data with respect to the quality criterion by the at least one evaluation unit to determine whether at least one of the barcode region, the detection code region, and the region with the different textures is present.

12. An apparatus comprising:
one or more processors;
at least one non-transitory computer-readable storage medium in communication with the one or more processors; wherein the one or more processors are configured to:
capture the surface of a workpiece to be measured by at least one triangulation laser scanner by moving the at least one triangulation laser scanner relative to the workpiece to be measured or moving the workpiece to be measured relative to the at least one triangulation laser scanner, and passing over at least a part of the surface of the workpiece by a laser line and thereby capturing actual lateral positions of image points of the laser line on a metal-oxide-semiconductor (CMOS) sensor chip, the at least one triangulation laser scanner including the CMOS sensor chip, an imaging optical unit and a laser line light source configured to generate the laser line on the workpiece to be measured, the CMOS sensor chip and the laser line light source being arranged relative to the imaging optical unit in compliance with a Scheimpflug condition, and the surface of the workpiece to be measured having at least two different regions, the at least two different regions including at least one of a region with different textures, a barcode region, and a detection code region;
restrict an amount of data generated on the CMOS sensor chip in an image recording to a reduced amount of data, the reduced amount of data including data of the actual lateral positions of the image points of the laser line and data of at least one quality criterion for each of the image points of the laser line, the at least one quality criterion being a measure of an intensity distribution along a direction transverse to a local direction of extent of the image points of the laser line on the CMOS sensor chip;

transfer the reduced amount of data to at least one evaluation unit at a clock rate greater than a maximum possible clock rate for reading out data of all of the pixels on the CMOS sensor chip;

generate surface coordinates of the workpiece to be measured based on the image points of the laser line captured on the CMOS sensor chip by the at least one evaluation unit, the surface coordinates being calculated based on lateral offsets of captured actual positions of the image points relative to nominal positions of the image points of the laser line; and analyze the reduced amount of data with respect to the quality criterion by the at least one evaluation unit to determine whether at least one of the barcode region, the detection code region, and the region with the different textures is present.

\* \* \* \* \*